United States Patent [19]

Andrews

[11] Patent Number: 5,080,536
[45] Date of Patent: Jan. 14, 1992

[54] BORING BAR SLEEVE

[76] Inventor: Edward A. Andrews, 1475 Ravine View Ct., Bloomfield Hills, Mich. 48013

[21] Appl. No.: 576,219

[22] Filed: Aug. 13, 1990

[51] Int. Cl.$^5$ .............................................. B23B 31/04
[52] U.S. Cl. ................................ 408/239 A; 82/161; 279/1 A
[58] Field of Search ............... 408/239 A, 239 R, 238, 408/150, 185, 111; 82/161, 160, 1.2, 158; 279/1 A, 83

[56] References Cited

U.S. PATENT DOCUMENTS

| | | | |
|---|---|---|---|
| 2,362,053 | 11/1944 | Danielson | 82/161 |
| 2,559,742 | 7/1951 | Waters | 82/161 X |
| 3,555,943 | 1/1971 | Papp | 82/161 |
| 3,731,562 | 5/1973 | Heuser | 82/1.2 |
| 3,754,767 | 8/1973 | Bennett | 82/158 X |
| 4,277,993 | 7/1981 | Engels | 82/161 |
| 4,896,892 | 1/1990 | Andrews | 279/1 A |
| 4,958,966 | 9/1990 | Andrews | 408/239 A |

FOREIGN PATENT DOCUMENTS

| | | | |
|---|---|---|---|
| 165906 | 10/1983 | Japan | 279/1 A |
| 2198374 | 6/1988 | United Kingdom | 279/1 A |

*Primary Examiner*—William Briggs
*Attorney, Agent, or Firm*—Harness, Dickey & Pierce

[57] ABSTRACT

A boring bar sleeve for mounting a boring bar upon a socketed tool holder of a machine tool is formed of an elongated tube having an outside diameter corresponding to the diameter of the tool holder socket for securing the sleeve within the socket. The tube has a forward end portion, which extends forwardly out of the socket, and within which different elongated tubular bushings may be inserted. The bushings all have the same outside diameter which corresponds to the sleeve inner diameter for interchanging one bushing with another within the sleeve. But, each bushing has a different inner diameter which is of a preselected size that corresponds to a preselected diameter boring bar. The bushings each have a longitudinally elongated slot formed through their walls. A series of longitudinally aligned, spaced apart set screws extend through threaded openings formed in the forward end portion of the tube and through the bushing slot to engage a boring bar inserted within the bushing.

4 Claims, 1 Drawing Sheet

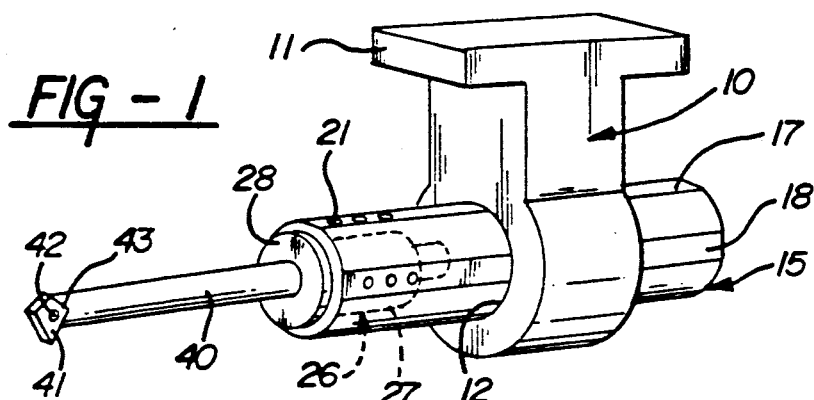
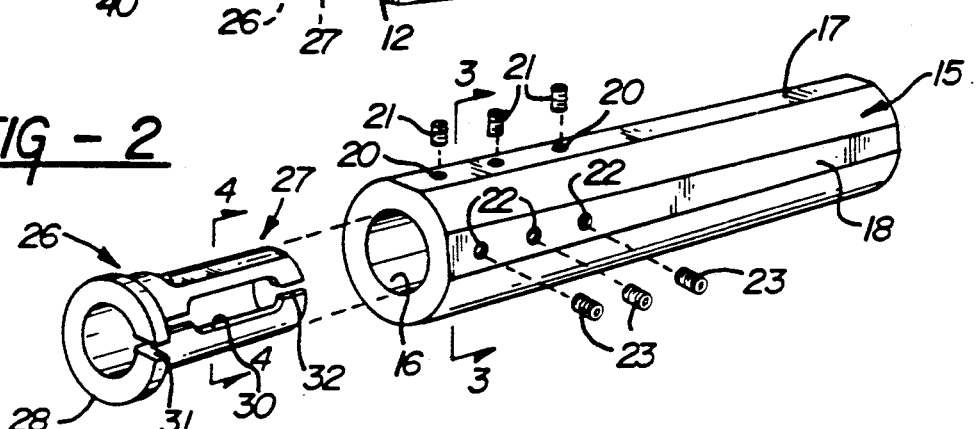
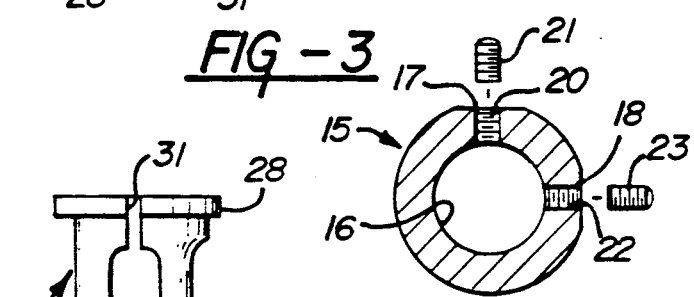
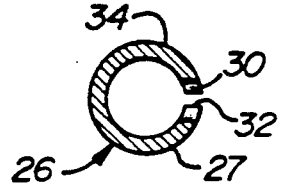
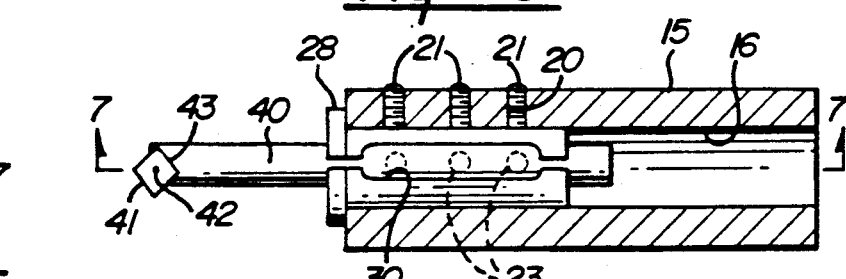
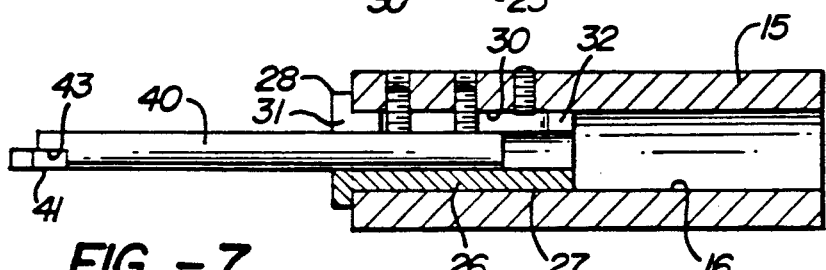

BORING BAR SLEEVE

BACKGROUND OF INVENTION

This invention relates to an improved boring bar sleeve for mounting different diameter and length boring bars within a single boring bar sleeve secured within the tool holder of a machine tool.

Machine tools which utilize boring bars for performing boring cutting of work pieces, commonly include a tool holder positioned upon a turret or other machine part. The tool holders include a socket within which a boring bar sleeve is fastened. The boring bar, an elongated shaft having a cutter or cutting insert fastened on its lead end, is inserted within the sleeve for mounting it upon the tool holder.

The diameters and lengths of boring bars vary considerably depending upon the particular machining operation required. Therefore, it is common to utilize different boring bar mounting sleeves, that is, mounting sleeves which have different diameter interior openings, for receiving correspondingly different diameter boring bars.

Since fastening a boring bar sleeve in the tool holding socket of a machine tool requires some time and labor, it is desirable to avoid moving or replacing the sleeve in order to accommodate each different size boring bar. Moreover, since a variety of different size boring bars requires an equally large variety of sleeves, it would be desirable to provide some means for reducing the number of sleeves so as to reduce the expenses and the storage of numerous sleeves.

Further, since boring bars are available in different lengths and, since the distance that a boring bar extends forwardly of the open end of the sleeve may vary, it is difficult to provide a single sleeve for properly holding boring bars relative to the tool holder. Thus, it would be desirable to have a universal sleeve means which permits the use of different diameter and length boring bars and different diameter extension lengths without changing the boring bar sleeve or moving it relative to the tool holder socket.

Thus, this invention relates to a boring bar sleeve having a major portion which is universally useable with different diameters, lengths and extensions of boring bars mounted upon tool holders of machine tools.

SUMMARY OF INVENTION

The invention herein contemplates a boring bar mounting sleeve which is formed of a thick wall, uniform diameter tube which is sized to mount within the socket of a tool holder of a machine tool. The inner diameter of the tube is considerably larger than the largest expected outer diameter of the boring bars to be utilized with such sleeve.

A removable and replaceable bushing is inserted in the forward end of the sleeve, that is, the end which extends forwardly of the tool holder. The bushing is part of a set of bushings which are interchangeable. Each bushing, in the set, has the same exterior diameter and is of a length to fit within the forward end portion of the sleeve. However, the inner diameter of each bushing is of a preselected size to correspond to the outer diameter of a specific size boring bar. Thus, each bushing is used with a particular diameter boring bar.

The bushing is held within the sleeve by set screws which are longitudinally aligned along the forward end portion of the sleeve. The screws extend through a slot in the bushing wall for engaging the exterior surface of a boring bar located within the bushing. By locating the set screws near the forward end of the sleeve, regardless of the length of the portion of the boring bar inserted within the bushing, at least two set screws grip the boring bar. When a longer portion of a boring bar is inserted within the bushing, more of the screws engage the boring bar for holding it within the sleeve.

Thus, this invention contemplates using a single sleeve which is fastened within the tool holder socket and remains in place and a number of different, replaceable bushings, whose inner diameters vary to correspond to different size diameter boring bars. A simple set screw arrangement holds the boring bar and its bushing within the sleeve.

An object of this invention is to provide an inexpensive boring bar sleeve arrangement which reduces the number of sleeves required in inventory for each machine in a machine shop and which permits the utilization of sets of inexpensive bushings to accommodate different size and length boring bars.

Another object of this invention is to provide a boring bar mounting system which reduces the amount of labor needed for changing the mounting of different diameter or different length boring bars relative to the tool holder of the machine tool.

Still a further object of this invention is to permit the use of simple, inexpensive bushings, to accommodate different diameter and length boring bars and to permit variations in the lengths of extensions of boring bars from the tool holder without materially increasing the amount of labor or expense required for adjusting the equipment needed for boring a particular opening in a work piece.

These and other objects and advantages of this invention will become apparent upon reading the following description, of which the attached drawings form a part.

DESCRIPTION OF DRAWINGS

FIG. 1 schematically illustrates a tool holder of a machine tool with the boring bar sleeve and boring bar mounted therein.

FIG. 2 is a perspective view of the boring bar tubular sleeve and the boring bar holding socket.

FIG. 3 is an enlarged, cross sectional view through the sleeve taken in the direction of arrows 3—3 of FIG. 2.

FIG. 4 is an enlarged, cross sectional view of the socket taken in the direction of arrows 4—4 of FIG. 2.

FIG. 5 is a plan view of the socket.

FIG. 6 is a view, partially in cross section, showing the sleeve, the socket arranged within the sleeve, and a boring bar held within the socket.

FIG. 7 is a view, partially in cross section, taken as if in the direction of arrows 7—7 of FIG. 6, showing the sleeve in cross section, a socket within the sleeve, and a boring bar having a shorter portion thereof arranged within the socket and secured within the socket by only two screws.

DETAILED DESCRIPTION

FIG. 1 schematically illustrates a tool holder 10 for use on a machine tool, such as for mounting upon the turret of a machine tool. The holder includes a suitable mounting plate 11 and a circular socket 12.

A boring bar mounting sleeve 15 is secured within the socket 12. The sleeve is formed of a thick wall tube having a central opening 16. Preferably, the tube is formed of a heavy, thick steel material. A longitudinally extending, narrow, flat band or stripe 17 extends along the length of the tube. Offset at about 90° from the band 17 is a second narrow, flat, band or stripe 18.

A series of screw holes 20 are formed in the band 17. The holes are aligned longitudinally of the tubular sleeve and are spaced apart, one from another, longitudinally. Each screw hole is threaded and receives a threaded set screw 21.

Similarly, a second series of threaded screw holes 22 are formed in the flat band 18. These threaded holes received set screws 23. The screw holes and the set screws are arranged near the forward end portion of the tubular sleeve, that is, the portion which extends forwardly of the tool holder 10.

A tubular socket 26 is arranged to fit within the opening 16 in the tubular sleeve 15. This socket is similar in construction to the socket disclosed in my prior U.S. Pat. No. 4,896,892 issued Jan. 30, 1990 for a Tool Holder Bushing. While the specific form of bushing used for the present invention may vary from that shown in my prior patent, the bushing disclosed in the prior patent exemplifies a type of bushing useful for the present purpose.

Thus, the bushing 26, and more particularly, its tubular body 27, is provided, at its forward end, with an annular rim 28 which extends radially outwardly of the body. An elongated, longitudinally directed slot 30 is formed in the body 27. The bushing wall material at the opposite ends of the slot 30 are cut to form a forward slit 31 and a rear slit 32. Thus, the tubular body is resiliently compressible, since the tube is preferably formed of a steel material which has some small amount of resiliency and recoverability upon compression.

A narrow, flat band or stripe 34 is formed along the length of the socket tubular body 27.

In use, the bushing 26 is inserted within the opening 16 in the tubular sleeve. The outer diameter of the bushing is selected to provide a close, snug fit for the bushing within the sleeve. However, the inner diameter of the bushing is preselected to correspond to the outer diameter of a specific size boring bar 40.

As illustrated schematically in FIGS. 6 and 7, the boring bar 40 comprises an elongated shaft. A conventional cutter or hard insert 41 is secured, such as by a screw 42, in a socket 43 formed on the free, outwardly extending end of the bar. The construction of a boring bar, the type of cutter or insert used therewith, and the means for fastening the cutter are conventional. Therefore, these parts are shown schematically.

As illustrated in the cross sectional view of FIG. 6, the boring bar is inserted within its corresponding bushing and extends through the bushing. If the bar is of sufficient length, or if it is deeply retracted within the bushing, it will extend completely through the bushing into the opening 16 in the sleeve. At that point, the set screws 22 are tightened so as to extend through the slot 30 in the bushing and against the boring bar to lock the bar in place. Meanwhile, the screws 23 may be tightened to abut against the flat band or stripe on the bushing to hold it in place. If screws 23 are tightened sufficiently, they will compress the bushing so as to tightly grip the boring bar.

As shown in FIG. 7, where the boring bar is not long enough, or only a small part of the boring bar is arranged within the bushing, at least two screws 22, extending through the slot 30 in the socket, will engage the end portion of the boring bar that is located within the bushing. Since the screws are located near the forward end of the sleeve 15, at least two screws will engage the boring bar at all times.

Although three screws are illustrated in the drawings, in some uses, depending upon the sizes of the parts, it may be desirable to use more set screws in order to provide sufficient locking of the parts.

When it is desired to change from one diameter boring bar to a different diameter boring bar, the screws 21 and 23 are loosened. Next, the boring bar which is located within the sleeve, and its particular bushing, are manually withdrawn from the opening 16 in the sleeve. Then, a different bushing of a different inner diameter, is inserted within the opening 16 in the sleeve. A correspondingly sized boring bar is inserted and the screws are retightened.

In the change of boring bars and sockets, the tubular sleeve 15 remains fixed in position within the tool holder socket. Thus, the change of boring bars can be accomplished rapidly without adjustments of the tool holder or of the tubular sleeve fastened within the tool holder. In addition, the amount of extension of the boring bar forwardly of the sleeve can be easily adjusted by loosening the set screws and retightening them when the desired length of boring bar extends forwardly of the sleeve.

In a typical machine shop, this construction makes it possible to eliminate the usual inventory of a large number of boring bar tubular sleeves having different inner diameters to correspond to different diameter boring bars. Instead, a single sleeve may be used on the machine tool, remaining on the machine tool at all times, and an assortment of bushings may be kept available. Since the bushings are relatively small, inexpensive, and easy to handle, the expense is substantially reduced as compared to the use of numerous tubular sleeves.

This invention may be further developed within the scope of the following claims. Accordingly, it is desired that the foregoing description be read as being merely illustrative of an operative embodiment of this invention and not in a strictly limited sense.

Having fully described an operative embodiment of this invention, I now claim:

1. A boring bar sleeve for mounting different length and diameter boring bars upon a tool holder secured to a machine tool, with the tool holder having a tool mounting socket therein, comprising:

an elongated, thick wall rigid tubular sleeve of substantially uniform cross section, having an outside diameter corresponding to the diameter of the tool holder socket for closely fitting within the socket, and an inner diameter which is considerably larger than the outside diameter of boring bars which are to be mounted within the sleeve;

said sleeve having an open forward end and a forward end portion extending from the forward end part way towards the opposite end of the sleeve, which forward end portion normally extends outwardly of said tool holder socket when the sleeve is arranged within the socket;

a series of radially directed set screws extending through threaded openings formed in the wall of the sleeve along the sleeve forward end portion with the screw holes being longitudinally aligned along the sleeve and longitudinally spaced apart from each other, said sleeve having a narrow, uniform width, flat stripe formed on its outer surface with the stripe extending the full length of the sleeve, and said series of screw holes being formed within the stripe;

an elongated tubular bushing of considerably shorter length than the tubular sleeve, fitted within the sleeve open forward end and extending within the tubular sleeve from the sleeve forward end along the sleeve forward end portion;

said bushing having an outer diameter of a size corresponding to the inner diameter of the tubular sleeve and normally being snugly fitted within the sleeve;

and said bushing having an inner diameter of a preselected size to correspond to and to closely receive a predetermined outside diameter elongated boring bar with the boring bar extending through at least a portion of the sleeve and having a portion extending forwardly of the bushing, that is, outwardly of the sleeve, and having a cutter fastened on its free, forward end, for machining metal;

and said bushing being manually removable from the sleeve and being interchangeable with a number of substantially identical bushings which all have the same outer diameter, but which each have a different, predetermined, inner diameter which corresponds to a specific, preselected diameter boring bar, so that each bushing receives a particular diameter boring bar for mounting that bar within the sleeve;

and said bushing having an elongated slot extending longitudinally thereof, through the wall of the bushing, for receiving said set screws, with the set screws being of a length to extend through the bushing slot and to engage against the exterior surface of a boring bar contained within that bushing for fastening the boring bar within the sleeve;

and with the screw holes in the sleeve being so located, relative to the forward end of the sleeve, that at least the two most forwardly located set screws will engage the boring bar when the portion of the boring bar extending within the bushing and sleeve is relatively short, but more of the screws will engage the boring bar portion within the bushing and sleeve when that portion is relatively longer;

whereby different length and different diameter boring bars may be mounted within the same tubular sleeve, which is secured within the tool holder, by interchanging bushings of corresponding inner diameters, and using less than all of the set screws for fastening the boring bars within the set screws for mounting different length and diameter boring bars within the sleeve and for adjusting the distance that the boring bar extends forwardly of the sleeve.

2. A boring bar sleeve as defined in claim 1, and including said bushing having a narrow, radially outwardly extending, annular rim formed on its forward end for engaging against the area of the sleeve forward end portion which defines the opening in the tubular sleeve.

3. A boring bar sleeve as defined in claim 2, and said bushing having narrow slits in longitudinal alignment with said slot at the opposite ends of the bushing, and said bushing tube being relatively resilient so that it may be resiliently compressed;

said bushing having a narrow, flat stripe longitudinally extending over a substantial portion of its length;

and said set screws being arranged for engaging against the narrow stripe in the bushing, alternatively to extending through the slot, for compressing the bushing against a boring bar arranged therein.

4. A boring bar sleeve as defined in claim 3, and including a second series of set screws extending through said screw openings arranged at an angular distance from the first set screws and extending radially through the sleeve forward end portion for engaging through the slot in the bushing against the boring bar.

* * * * *

UNITED STATES PATENT AND TRADEMARK OFFICE
CERTIFICATE OF CORRECTION

PATENT NO. : 5,080,536

DATED : January 14, 1992

INVENTOR(S) : Edward A. Andrews

It is certified that error appears in the above-identified patent and that said Letters Patent is hereby corrected as shown below:

Abstract, Line 23: after "bushing." insert --Thus, different bushings may be used to mount different diameter boring bars. The set screws are arranged so that at least the screws nearest the sleeve forward end will engage the boring bar if the boring bar portion within the sleeve is relatively short, and more of the screws will engage the boring bar if the portion within the sleeve is longer.--

Signed and Sealed this

First Day of June, 1993

Attest:

MICHAEL K. KIRK

Attesting Officer

Acting Commissioner of Patents and Trademarks